June 8, 1943.   J. C. WILSON   2,321,442
COLLAPSIBLE ANTIFRICTION NUT
Filed Dec. 10, 1941   5 Sheets-Sheet 1

INVENTOR
JOHN C. WILSON
By Taulmin & Taulmin
ATTORNEYS

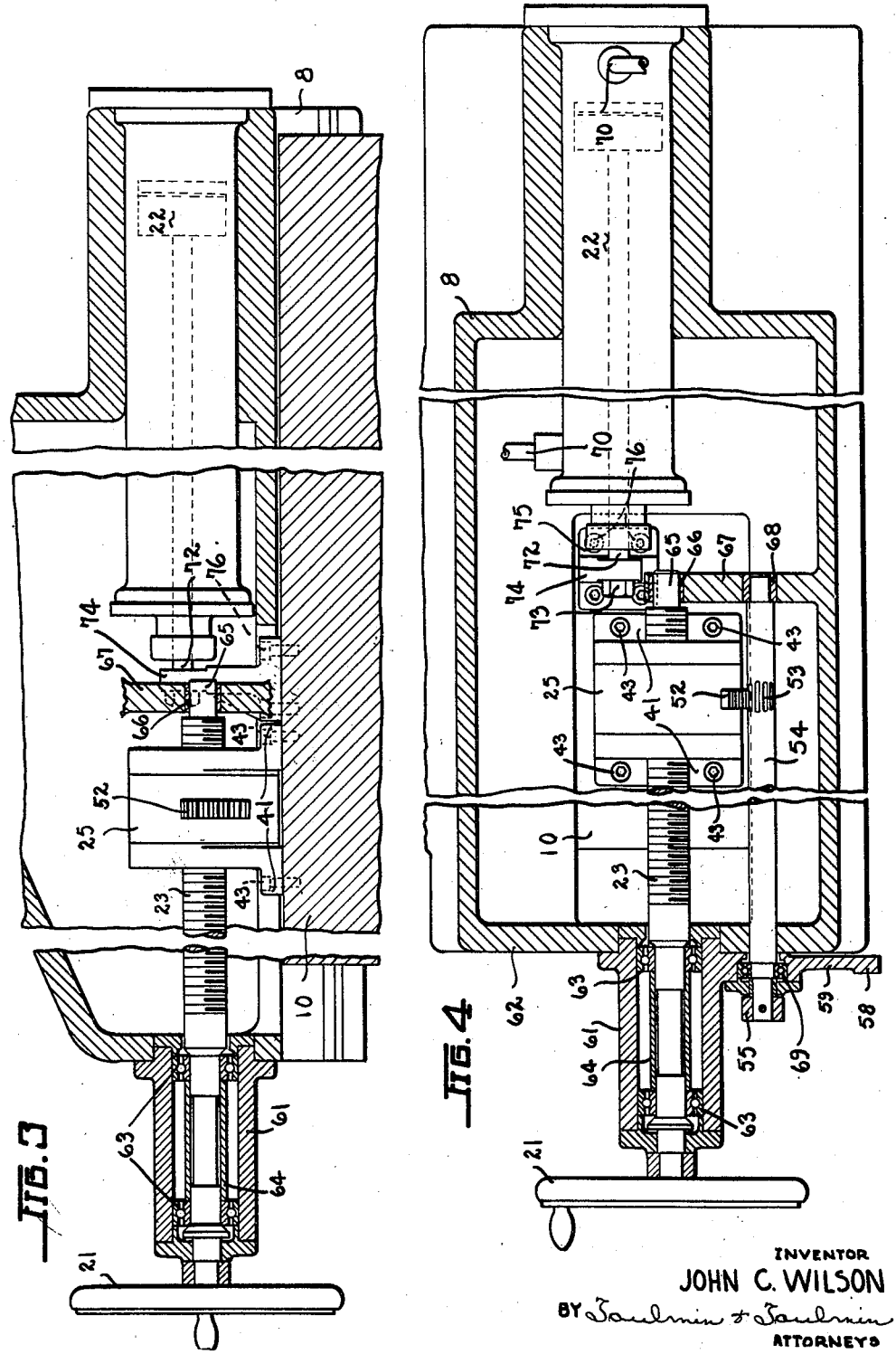

June 8, 1943. J. C. WILSON 2,321,442
COLLAPSIBLE ANTIFRICTION NUT
Filed Dec. 10, 1941 5 Sheets-Sheet 3
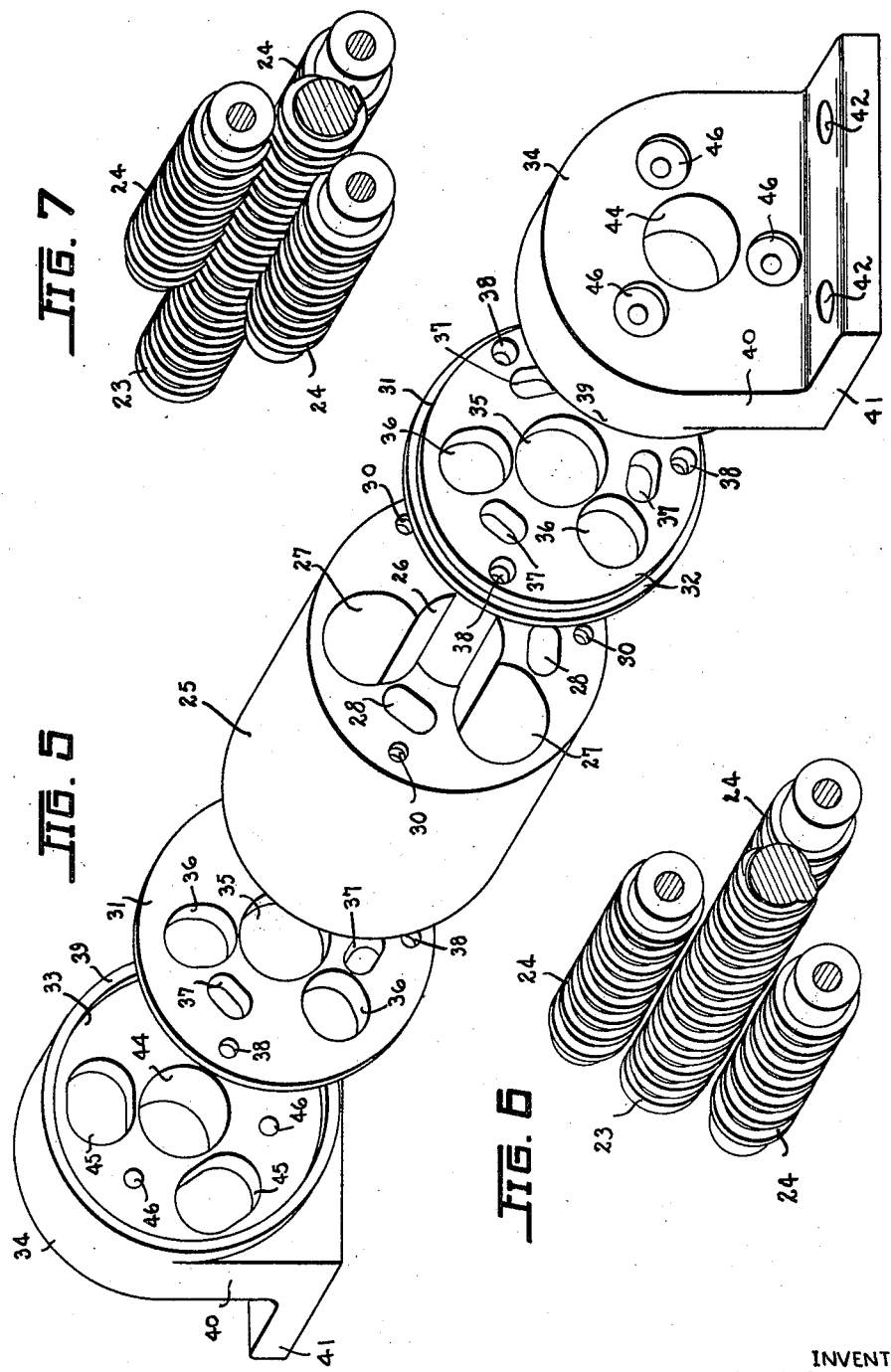
INVENTOR
JOHN C. WILSON
BY
ATTORNEYS June 8, 1943.  J. C. WILSON  2,321,442
COLLAPSIBLE ANTIFRICTION NUT
Filed Dec. 10, 1941  5 Sheets-Sheet 4
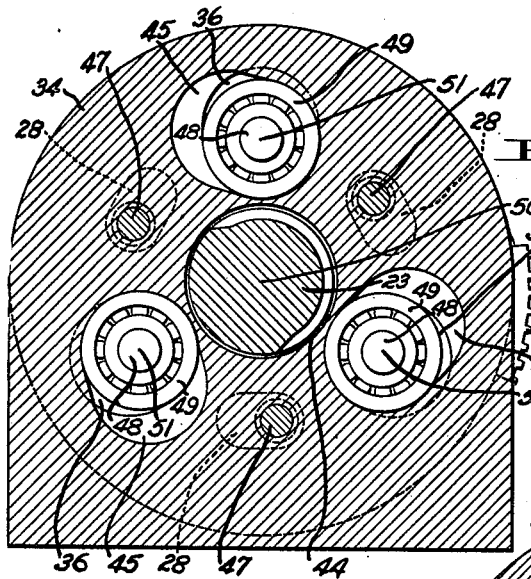
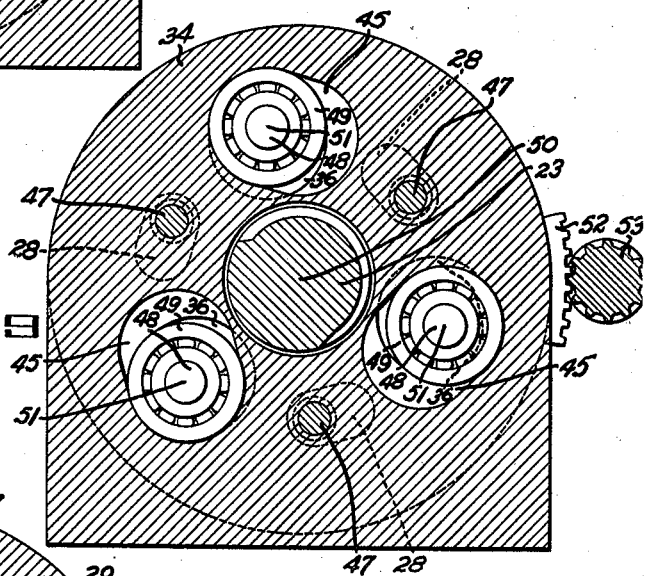
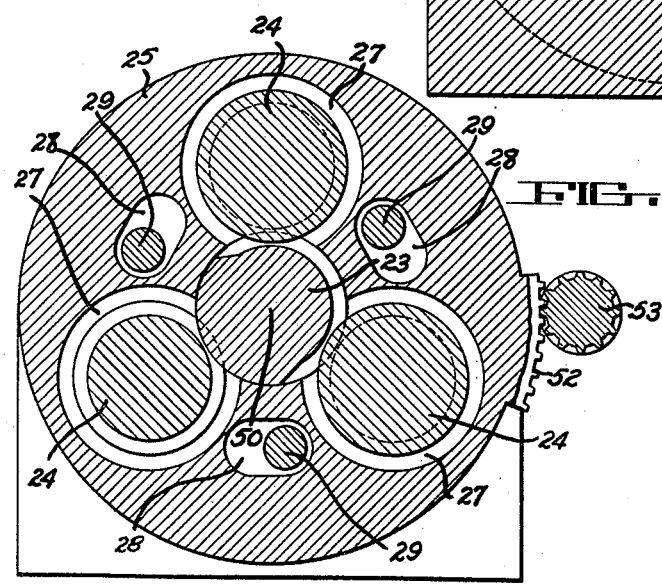
INVENTOR
JOHN C. WILSON
ATTORNEYS June 8, 1943.   J. C. WILSON   2,321,442
COLLAPSIBLE ANTIFRICTION NUT
Filed Dec. 10, 1941   5 Sheets-Sheet 5
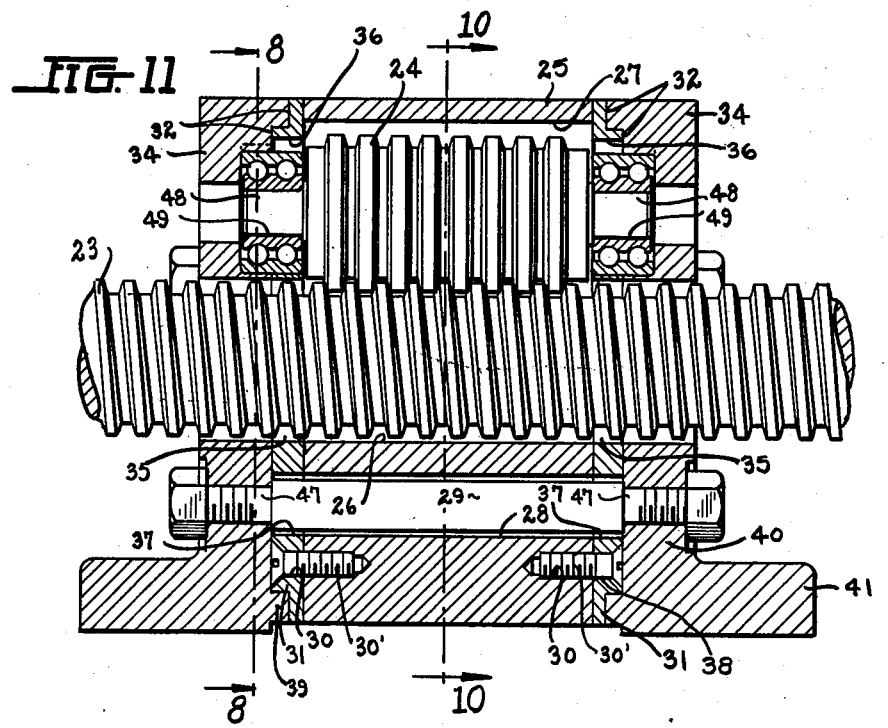
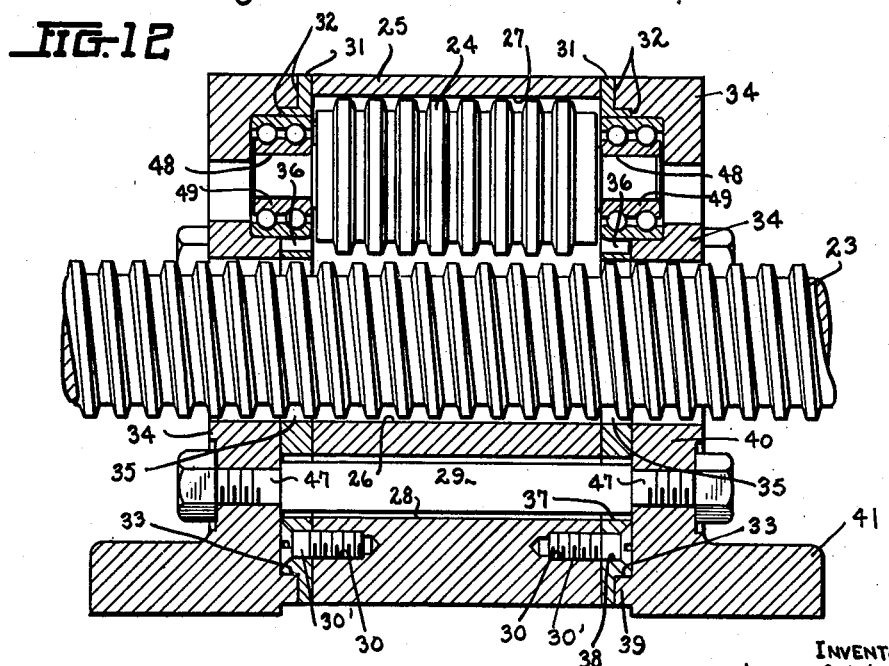
INVENTOR
JOHN C. WILSON
BY Toulmin & Toulmin
ATTORNEYS Patented June 8, 1943

2,321,442

UNITED STATES PATENT OFFICE 2,321,442

COLLAPSIBLE ANTIFRICTION NUT

John C. Wilson, Springfield, Ohio, assignor to The Thompson Grinder Co., Springfield, Ohio, a corporation of Ohio Application December 10, 1941, Serial No. 422,463

12 Claims. (Cl. 74—424.8)

The present invention relates to mechanical couplings between driving and driven members.

In certain applications in the mechanical arts it is often necessary to provide a coupling between two movable parts which will permit one of the parts to be disconnected from the other when independency of movement is required. Various forms of clutches have been heretofore devised, but in many cases the clutches are of a complicated nature and are not strictly of a positive and non-slipping character, particularly when transmitting large amounts of power. Again, in many types of mechanism, considerable movement of the interconnected parts is necessary to engage or disengage those parts. Consequently, the act of engaging or disengaging the clutch is not instantaneous, and inaccuracy may be introduced into the machine operation which is controlled by the clutch.

Certain modern machines, for example, grinding machines or drill presses, are of the so-called "power-driven" and "manually-operated" types, in which case it may be desired to switch the actuation means from a manual control to a power drive, or vice versa, depending on the character of the work which is being performed. These drives may be incompatible when both types of drive are simultaneously effective, because the driving mechanism in both cases may be of a non-reversible character so that one type of drive cannot actuate the other type of drive and the two drives are mechanically interlocked. Thus the driving mechanism, i. e. both the manual and power driver, become interlocked, and the operation of the machine is brought to an abrupt stop. In such case it is, of course, necessary that before one type of drive is connected to the machine the other type must have been completely disconnected. This necessitates a quick-acting clutch during both the engaging and disengaging operations, so that when one type of drive is substituted for the other the necessary changes are quickly made at the clutch, preferably by a mere manipulation of a hand-operated device.

The primary object of the present invention is to provide a clutch of simple design, capable of transmitting considerable mechanical power without slippage and undue wear, and which may be instantaneously connected and disconnected when necessary. The invention has been disclosed, by way of illustration, in connection with a grinding machine, the grinder spindle of which may be moved either by a hand wheel or alternately by power-driven apparatus.

The foregoing object is carried out in the typical structure shown by providing a so-called "collapsible anti-friction nut" formed of a main worm screw positioned between a plurality of parallelly aligned grooved rollers. The latter are contained within a housing or barrel in such a manner that when the housing is rotated the parallelly aigned elements are immediately moved into and out of engagement with the main screw. This main screw is normally connected to the hand wheel, and the housing is connected to the reciprocable part of the machine, and in the typical case to the tongue of the grinder which carries the grinder spindle. Thus when the main worm screw is effectively disconnected from the surrounding rollers the grinder spindle is mechanically disconnected from the hand wheel and the grinder spindle may then be operated by power-driven apparatus.

Other objects and features will appear when the following specification is read in connection with the drawings.

In the drawings:

Figure 3 is a vertical section taken along the line 3—3 in Figure 2, and showing the apparatus in somewhat smaller size than in Figure 2.

Figure 4 is a section substantially horizontal and taken along the line 4—4 in Figure 2.

Figure 5 is an exploded view of the improved clutch parts, but with the grooved elements removed to clarify the illustration.

Figure 6 is a perspective view showing the grooved elements out of mesh, and the clutch in an inoperative condition.

Figure 7 is a view similar to Figure 6, but showing the grooved elements in mesh and the clutch operative.

Figure 8 is a section of the clutch structure taken through the ball bearings on which some of the grooved elements are mounted, and viewing the structure when the clutch is engaged. This section is taken along the line 8—8 in Figure 11.

Figure 9 is a section taken along the same line as Figure 8, but showing the position of the ball bearings as a group when the grooved elements are out of engagement.

Figure 10 is a section taken through the worm screw structure when the clutch is in an engaged condition. The section line of Figure 10 is indicated as 10—10 in Figure 11.

Figure 11 is a longitudinal section of the clutch housing but showing the grooved elements in elevation and in mesh to provide an engaged clutch.

Figure 12 is a view similar to Figure 11 except that the grooved elements are shown out of engagement to render the clutch inoperative.

Figure 1:
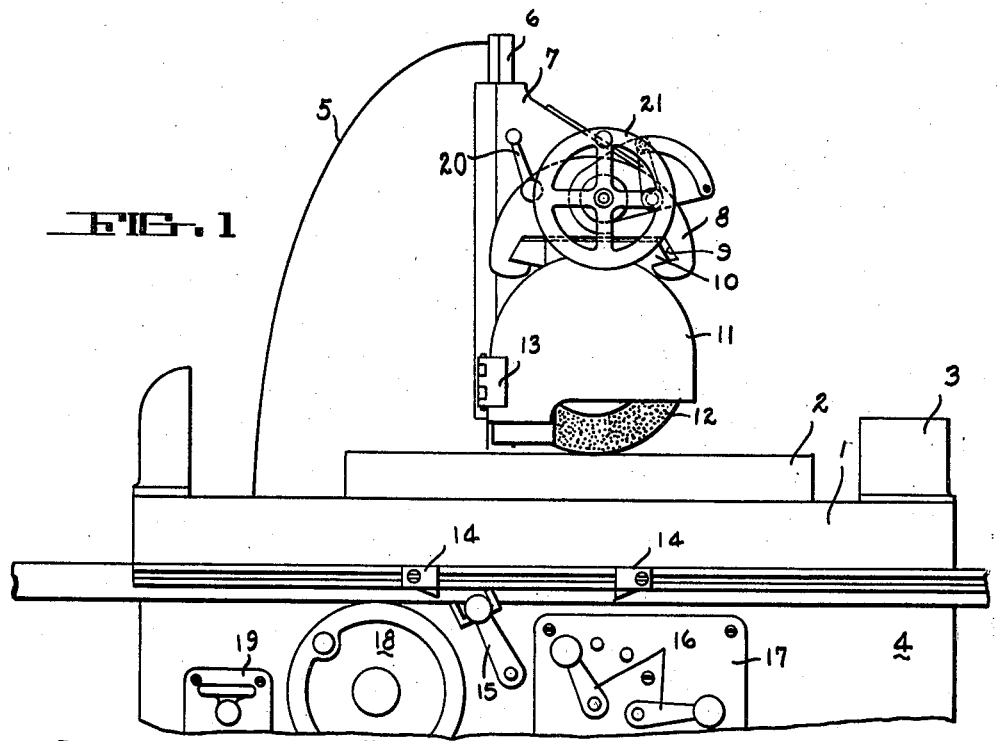
Figure 1 is an elevational view of a typical machine to which the improved clutch or collapsible nut has been applied, which machine is illustrated as a grinder.

Referring more particularly to Figure 1, it shows only those elements of a typical grinding machine which are immediately concerned with the improved clutch. Reference numeral 1 designates a reciprocable table on which the workpiece 2 is clamped in any suitable manner. The table is provided at each end with spark-protecting guards 3, and the entire structure is mounted on the bed 4 of the machine. Rising upwardly from the bed there is a heavy upright member 5 which is provided at its right-hand side, as shown, with a pair of oppositely positioned wedge-shaped faces 6 which constitute tongues for slidably carrying a movable head member 7. The latter is provided with wedge-shaped grooves (not shown) which fit fairly snugly over the faces 6 of the upright member 5 so that the head is slidably supported in the vertical direction.

The head member 7 terminates in the usual form of saddle 8, which is also provided with a laterally extending wedge-shaped groove 9. The saddle 8 is of considerable length, as measured in the lateral direction of the machine, so that the groove 9 provides a long bearing surface for the tongue 10 of a grinding wheel carrier, only one of the guard elements 11 being illustrated. This carrier rotatably supports a grinding wheel spindle (not shown) which carries the grinding wheel 12, and one of the guard elements 11 preferably positioned on opposite sides of the wheel 12, is illustrated as being hingedly secured, as indicated at 13, to the carrier.

The bed 4 is provided with longitudinally extending rails (not shown) on which the table 1 is slidably mounted, and in order to control the length of travel of the table 1 the latter may be provided with dogs 14 which rock a lever 15 at each end of the table stroke to reverse the reciprocatory actuating mechanism of the table. The table may be actuated in any suitable manner, for example, by means of hydraulic cylinders (not shown), and the supply of pressure fluid to the cylinders is controlled by the levers 16 of the control panel 17. There is a hand wheel 18 also positioned on the side of the bed for effecting manual control of any of the movable elements, for example, the wheel may control the movements of the head 7. At 19 there is shown a switch for energizing the motor of the pump which supplies pressure fluid to the hydraulic cylinders referred to hereinbefore. A lever 20 is provided at the side of the saddle 8 nearer the operator, this lever serving to lock the head 7 in any desired position on the tongue 6, thus regulating the depth of cut produced by the wheel 12 on the workpiece 2.

In the operation of a machine of this character the table 1 is caused to reciprocate either by the use of a double-acting hydraulic cylinder referred to hereinbefore, or by an electric motor (not shown), and the top surface of the workpiece 2 is caused to pass under the surface of the abrasive wheel 12. The latter is, of course, raised by the wheel 18 at the end of the stroke of the table 1 and is again lowered at the beginning of the next stroke. In order that the entire width of the workpiece 2 will have passed under the grinding wheel 12 it is necessary that the latter shall be moved a predetermined distance in the lateral direction at the beginning of each working stroke.

This lateral movement of the grinding wheel may be effected either by a hand wheel 21 through an improved clutch, which will be described presently, or by means of a power-driven element, illustrated as a hydraulic cylinder 22 in Figure 4. When it is desired to move the grinding wheel laterally by the hand wheel 21, it is apparent that the power actuator 22 shall be disconnected, and vice versa. As will be explained hereinafter, due to the manner in which the manually-operated and power driving mechanism are connected to the common mechanism which effects lateral movement of the abrasive wheel 12, it is necessary that this common mechanism be at all times completely disconnected from one or the other of the driving mechanisms for otherwise a locking effect would be produced between the two driving mechanisms.

Various forms of clutches to effect this purpose have been devised in the prior art, but these clutches were not entirely satisfactory for a number of reasons. In some cases considerable movement of the actuating parts for engaging and disengaging the clutch are necessary, which causes delay in making and breaking the mechanical connections, and this delay may cause inferior grinding effects at the workpiece 2. Again, in the case of large grinding machines which require considerable power to move the heavy grinding wheel and its carrier in the lateral direction, slippage was found to exist within the clutch so that the wheel would not progress in a uniform manner across the width of the workpiece. In accordance with the present invention there is provided an improved form of clutch, in which none of these disadvantages is present, and the operation of the clutch is such that an instantaneous change-over can be made between the manual and power control mechanisms for moving the wheel carrier in a lateral direction, and the engagement or disengagement of the clutch is brought about by a relatively small movement of the clutch adjusting elements.

The details of the improved clutch are shown more particularly in Figures 5 to 10. The essential parts of the clutch comprise a centrally positioned screw 23, illustrated as a worm, and a number of grooved rollers preferably equidistantly spaced about the central screw with the axes of all of the rollers extending in parallel relation. When the clutch is in disengaged position the three outer rollers 24 are moved to such a position by mechanism which will be described presently, that the annular projections of these rollers are entirely out of mesh with the threads of the central screw 23. This condition is illustrated in Figure 6. However, when the clutch is in engaged condition the projections of the outer rollers 24 are caused to mesh with the threads of the central screw 23, as is illustrated in Figure 7. Due to the fact that these projections or threads are of the square type they may be made of any desired thickness and the amount of mechanical power which may be transmitted through the clutch from one group of rods to the other is almost without limit. Furthermore, the amount of movement necessary to cause engagement and disengagement between the outer group of rollers and the central screw is relatively small. Figure 5 shows a typical form of mechanism by which the outer group of grooved rollers may be readily moved with respect to the central worm screw.

Reference numeral 25 designates a drum, which may be made of any suitable cast metal and is provided with a central opening indicated at 26 for loosely receiving the central screw 23. Openings 27, as many as there are rollers 24, radiate from the central opening 26 and are of a size as loosely to receive the rollers 24. The openings 26 and 27 extend the entire length of the drum. The latter is also provided with three or more longitudinally extending slots 28 which are adapted loosely to receive a number of bolts 29, shown in Figures 11 and 12. The purpose of making the slots 28 of an elongated configuration instead of circular shape will be apparent when the detailed operation of the clutch has been described. The drum 25 is also provided with threaded openings 30 for securing the two end cover plates 31, by means of screws 30', to the drum.

Each of the cover plates is provided with an outwardly extending flanged or shouldered portion 32, which portion slidably fits within a large countersunk opening indicated at 33 in the end plates 34. The cover plates are provided with central openings 35 for receiving the central screw 23. The size of these openings is slightly larger than the outside diameter of the screw 23. In addition to the opening 35, each cover plate is provided with three or more openings 36, as many as there are screws 24, and will be noted, these openings do not have the same shape as the rollers 24 but instead are elongated in the radial direction, for reasons which will appear when the operation of the clutch is described. Slotted openings 37, similar to the openings 28 in the drum 25, are provided in each cover plate. The cover plates are also provided with countersunk openings 38 which correspond to the openings 30 in the drum 25 for receiving the screws 30'.

The end plates 34 are constituted of a cylindrical member flanged at its inner edge, as indicated at 39, to form the countersunk opening 33, this cylindrical member being supported on a base portion 40, terminating in an outwardly extending horizontal flange 41. The flange 41 is provided with openings 42 for bolting the end plates to any part of the machine which it is desired to move when the hand wheel 21 is rotated, in this case the tongue 10, which is to be moved with respect to the saddle 8 of the grinder in order to provide a cross cut. The bolts are indicated at 43. Each end plate is provided with a central opening 44 and three or more equidistantly spaced openings 45, the central opening being of a circular configuration but the openings 45 being of an elongated shape for purposes which will be described presently. In addition to these openings, each end plate is provided with relatively small countersunk openings 46 for receiving the shanks 47 of the bolts 29 (Figures 11 and 12).

The opposite ends of the outer screws 24 terminate in shouldered portions 48 which tightly fit in the inner races of a number of ball bearing units 49, shown more clearly in Figures 8, 9, 11 and 12. The outer races of these ball bearing units are received in part by the openings 36 in the cover plates and in part by the openings 45 in the end plates (see Figures 11 and 12). The configuration of the openings 45 is such as to permit the ball bearings as a whole to be moved counter-clockwise (Figure 8), and also progressively to be moved a greater distance from the center 50 of the clutch unit, as indicated in Figure 9. Thus the openings 45 are elongated not only in the horizontal direction but extend slightly in a direction away from the center 50 of the clutch. It is apparent that if the three ball bearings were caused to move as a unit counter-clockwise (Figure 8) the center of each ball bearing, indicated at 51, and which corresponds with the axis of the screws 24, will be caused to move away from the center 50 of the clutch. A comparison of Figures 6 and 7 will show this operation clearly. For example, when the ball bearings 49 are in the position illustrated in Figure 8, the rollers 24 are caused to mesh with the central screw 23 but when the ball bearings have been moved as a unit counter-clockwise (Figure 8) to assume the position shown in Figure 9, the rollers 24 will have been moved entirely out of mesh with the central screw 23. In order to provide for this movement the drum 25 and the cover plates 31, which are bolted to the drum, are permitted to rotate within the countersunk openings 33 of the end plates 34.

Figure 2:
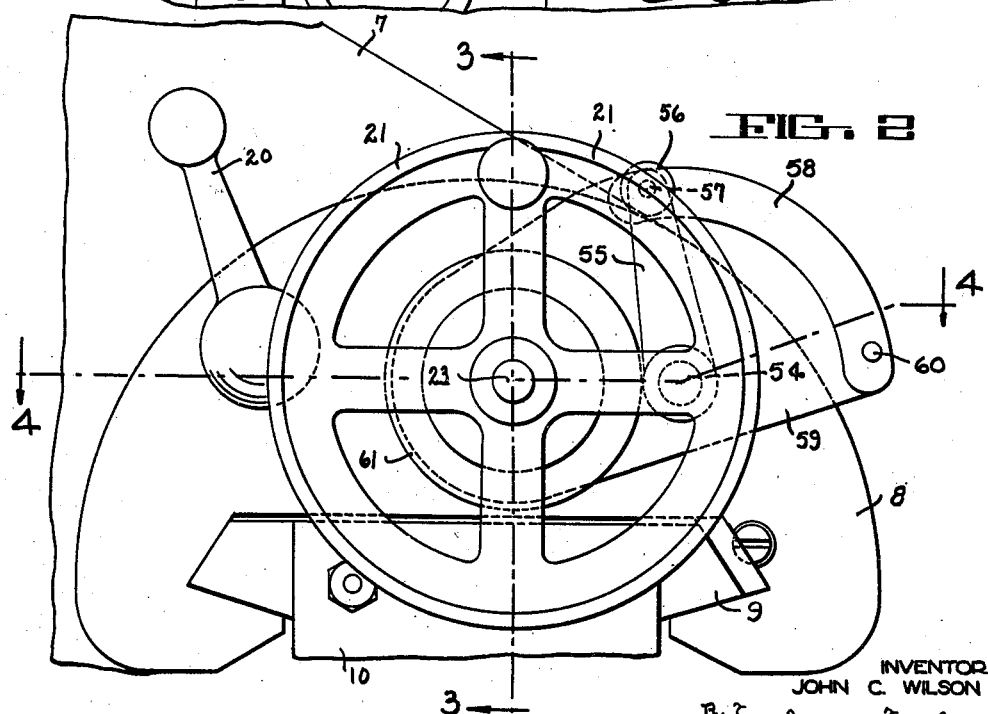
Figure 2 is an enlarged fragmentary view of the mechanism immediately surrounding the improved clutch.

The drum may be provided with a segmental gear 52 which meshes with a pinion 53 (Figures 8 and 9). The latter is carried on a shaft 54 (Figure 2) to which a lever 55 is secured. The outer end of the lever is provided with a hand knob 56 which terminates in a spring-pressed pin 57, adapted to ride over a quadrant flange 58 which forms part of a plate 59 secured to any convenient portion of the machine. The flange 58 is provided with an opening 60 at each end for receiving the pin 57, thus determining the two extreme positions of the lever 55. When the lever is in the position shown in Figure 2, the shaft 54 will have moved the segmental gear 52 through the pinion 53 to such an angle that the ball bearing units 49 are in the position shown in Figure 8, in which case the rollers 24 will be in mesh with the central screw 23. However, when the lever 55 will have been swung downwardly until the pin 57 fits into the opening 60, (Figure 2) the drum 25 will have been moved clockwise (Figure 9) to such a position as to cause the ball bearing units to contact the opposite ends of the elongated openings 45 of the end plates. In this case the rollers 24 will have been caused to move away from the central worm 23, and the clutch is disengaged.

When the ball bearing units 45 are moved from the position shown in Figure 8 to the position shown in Figure 9, it is apparent that each unit moves not only in the counter-clockwise direction but also outwardly. Consequently, the openings 36 in the coverplates, which also receive the ball bearing units, must be elongated in the radial direction in order to accommodate the radial movements of the ball bearing elements. Inasmuch as no binding effects can be permitted between the elements 23 24 and the bolts 29 on the one hand, and the drum 25 on the other hand, all of the openings through the drum which accommodate these elements must be sufficiently large to prevent any contact between the elements and the metal of the drum during the outward or inward movements of the rollers 24.

As shown in Figure 4, the central screw 23 is extended to the left through a hollow housing

6l which is secured to the frame 62 of the machine, this housing containing a pair of spaced ball bearings 63 which carry a reduced diameter portion of the screw 23. A spacing sleeve 64 may be employed to maintain the ball bearings 63 in position. After passing through the housing 6l, the screw 23 terminates at the hand wheel 2l. At the opposite end the screw 23 is provided with a shouldered portion 65 which is carried in a journal 66, provided in a web 67 which extends laterally from the frame 62 of the machine. The shaft 54 of the hand-operated lever 55 is also journalled in the web 67, as indicated at 68, the opposite end of the shaft being mounted in a ball bearing 69 so as to reduce the friction as much as possible when the shaft 54 is rotated by the movement of lever 55.

It has been explained that the end plates 34 of the clutch are bolted to any convenient portion of the member to be moved when the hand wheel 2l is operated. As illustrated, this member may be the slide or tongue l0 of the crossfeed mechanism which is to be moved with respect to the stationary saddle 8. Consequently, when the wheel 2l is rotated, and assuming that the lever 55 is in a position such as to cause the members 24 to mesh with the central screw 23, the thrust exerted by the last-mentioned screw is communicated through the members 24 and through the ball bearings 49 to the end plates 34, causing the tongue l0 of the cross-feed mechanism to move with respect to the saddle 8. Thus by turning the wheel 2l the grinding wheel l2 can be moved any desired distance across the work-piece 2. In certain types of grinders it is desirable to effect this crossfeed by a power-driven element instead of the hand wheel 2l. Figures 3 and 4 typify this power-driven element as a hydraulic cylinder 22, preferably of the double-acting type, to which pressure fluid is admitted in any desired manner through control valves and supplied to the conduits 70. The piston 7l of the cylinder is carried through the head and terminates in a rod 72 which is bolted, as indicated at 73, to an upright lug 74. This lug is supported on a base 75 which may be bolted, as indicated at 76, to the tongue l0 of the grinder, or any other part that it is desired to actuate when pressure fluid is applied to the cylinder 22.

In the operation of the grinder as a whole, let us assume that the table l is reciprocated in any suitable and well known manner, and that on the return trip of the table and the work-piece 2 it is desired to move the grinder spindle in the lateral direction a predetermined distance in order to provide the necessary crossfeed. If this operation is to be performed manually the lever 55 is set at such a position that the rollers 24 are caused to mesh with the central screw 23 so that when the wheel 2l is turned the tongue l0 is caused to move in a direction depending on the direction in which the wheel is rotated. If it is desired that this crossfeed shall be accomplished by the use of the hydraulic cylinder, the manually operated mechanism must be entirely and quickly disconnected, because any movement of the piston 7l would move the tongue l0 to which the end plates 34 are connected, and unless the rollers 24 were disconnected from the screw 23 a locking effect would be introduced which would probably damage the threads or other parts of the mechanism. It is therefore necessary merely that the lever 55 (Figure 2) be quickly moved to the other end of its path, thus rotating the shaft 54 and the combined drum and cover plate construction to cause the rollers 24 to disengage from the central screw 23. The latter is therefore free to turn and no binding effect is introduced when the tongue l0 is being driven by the hydraulic cylinder or other prime mover. It will be noted that when the clutch is disengaged, in the manner just described, or later when engaged, the actual movement of the rollers 24 is relatively small since it represents only slightly more than the depth of the screw threads. Consequently, the shift-over from the engagement to the disengagement position can be accomplished almost instantaneously.

The screw construction shown in Figures 6 and 7 and the mode of operation as described immediately are such that the construction may be properly characterized as a collapsible antifriction nut, in that the three rollers 24 are caused to collapse in position about the central screw 23 when the clutch is to be engaged. The presence of the ball bearings 49, on which the rollers 24 are mounted, and also the ball bearings 63 which carry the central screw 23, assure that little or no friction will be introduced at the collapsible nut when power is being transmitted. The character of the threads on the members 23, 24 may be such that large amounts of power can be readily handled by the collapsible nut or clutch.

The standard manual crossfeed construction has heretofore comprised a hand wheel driving a worm wheel mechanism, the output of the latter, in turn, reciprocating the grinder spindle through a rack and pinion. A clutch is included for permitting the rack and pinion to operate freely without affecting the worm and wheel when the hydraulic spindle is operating. This clutch is also manually controlled. The advantages of the new construction over that just mentioned are:

1. The operator is provided with perfectly smooth and free-turning manual control of the traversing of the spindle.

2. Less machining is required on the saddle, which is of rather difficult contour so far as machine work is concerned, the only openings required being those accommodating the crossfeed screw and the shaft for disengaging the collapsible nut.

3. The nut is a unitary structure, making for extreme ease of assembly and service.

4. Because of the rolling contact of the screw with the collapsible nut, there is a negligible amount of wear and consequently an inherent provision for long life under constant service.

While I have described the use of the improved clutch or collapsible nut as controlling the crossfeed movement of a grinder spindle, it is apparent that the invention is not limited to this use as obviously the improved clutch may be employed in all types of mechanism in which a quick, effective and powerful change-over from a manually-operated to a power-operated element is desired. In view of the speed with which the change-over can be made, greater accuracy of operation between the parts of the machine to which the clutch is applied may be obtained.

As an example of another use to which the improved clutch may be adapted, mention need only be made of the thread-cutting or tool-feeding attachments on a lathe which are usually controlled by hand wheels positioned on the traveling apron of the lathe. The collapsible nut arrangement shown in Figures 6 and 7 would be ideal in effecting a quick change-over from a manual to an automatic feed in these lathe operations. Many other uses will readily occur to those skilled in the machine arts.

While I have also described my improved clutch for the purpose of connecting or disconnecting a hand-operated mechanism to and from a machine which can be alternately actuated by a power-driven mechanism, it will be understood that if desired the clutch may be employed for connecting and disconnecting a mechanical power source to and from the machine. For example, the power source may comprise an electric motor, and in case it is desired to stop the working parts of the machine for only a relatively short time, the motor may be permitted continually to run but the parts are disconnected at the position of the improved clutch.

It will be understood that I desire to comprehend within my invention such modifications as come within the scope of the claims and the invention.

Having thus fully described my invention, what I claim as new and desire to secure by Letters Patent, is:

1. A clutch for a machine comprising a collapsible nut mechanism formed of a centrally positioned threaded rod portion and a surrounding nut portion formed of a plurality of grooved rollers, said rollers having parallel grooves extending at 90° with respect to the axes of the rollers and being adapted to engage and fit the threads of said rod portion, and means for simultaneously moving the rollers in and out of engagement with the threaded rod portion.

2. The combination of a mechanical coupling between driving and driven members, said coupling being formed of a centrally positioned threaded rod and a plurality of grooved rods extending along axes which are parallel to and surround the axis of the centrally positioned rod, said rollers having parallel grooves extending at 90° with respect to the axes of the rollers, said grooves being adapted to engage and fit the threads of said rod, and means for simultaneously moving said surrounding grooved rods into and out of mesh with the centrally positioned threaded rod in order to connect and disconnect said coupling.

3. A clutch for a machine comprising a centrally positioned screw and a plurality of grooved rollers arranged equidistantly about said centrally positioned screw and having axes which are substantially parallel to the axis of the centrally positioned screw, and means for moving the rollers as a unit into and out of mesh with the centrally positioned screw in order to engage and disengage the clutch.

4. A clutch for a machine comprising a threaded rod portion and a plurality of grooved elements surrounding said threaded rod portion and carried between a pair of cover plates, said cover plates being rotatably mounted on a pair of end plates and said end plates being secured to a movable part of said machine, the arrangement and position of said elements and threaded rod portion with respect to said cover and end plates being such that when the cover plates are moved relative to the end plates the projections of said rollers are selectively moved into mesh and out of mesh with the threads of said rod portion, whereby the clutch is selectively engaged and disengaged in order to control the transmission of power to said movable part of the machine.

5. A clutch for a machine comprising a main worm screw and a plurality of grooved rollers surrounding said main worm screw and carried between a pair of end plates, said plates being secured to a movable part of the machine which is moved when the main worm screw is rotated and the surrounding rollers are in engagement with the main worm screw, and means for moving the surrounding rollers simultaneously in and out of mesh with the main worm screw, whereby the clutch is selectively engaged and disengaged and the movement of said main worm screw no longer effects movement of the movable part of the machine.

6. A clutch for driving and driven members, said clutch comprising a plurality of grooved rollers surrounding lengthwise a centrally positioned screw, said surrounding rollers being mounted within a drum and carried between a pair of end plates, openings in said drum and end plates to receive the ends of said surrounding rollers, and means for moving said drum with respect to said end plates, said openings having configurations such that as the drum is moved in one direction the surrounding rollers mesh with the central screw and when the drum is moved in the opposite direction the surrounding rollers are moved out of mesh with the central screw.

7. A clutch for driving and driven members, said clutch comprising a plurality of grooved rollers surrounding lengthwise a centrally positioned screw, said surrounding rollers being mounted within a drum and carried between a pair of end plates, openings in said drum and end plates to receive the ends of said surrounding rollers, and means for moving said drum with respect to said end plates, said openings having configurations such that as the drum is moved in one direction the surrounding rollers mesh with the central screw and when the drum is moved in the opposite direction the surrounding rollers are moved out of mesh with the central screw, said means comprising a pinion and gear mechanism secured to the drum and operable by a lever suitably positioned with respect to said clutch.

8. A coupling for driving and driven members, said coupling comprising a drum, a pair of cover plates secured to the ends of said drum, said drum and cover plates having a central opening and a plurality of openings surrounding the central opening and receiving grooved rods, the rods which pass through said plurality of openings terminating in ball bearings, and a pair of end plates adjacent said cover plates and having openings which correspond with the openings of the cover plates, said drum and cover plates being adapted to rotate with respect to said end plates, said ball bearings being supported in part by the openings in the cover plates and in part by the openings in the end plates and a threaded rod passing through said central opening and adapted to mesh with all of said grooved rods, and means for rotating said drum and cover plates in order to cause the grooved rods to engage and disengage said threaded rod.

9. A coupling for driving and driven members, said coupling comprising a drum, a pair of cover plates secured to the ends of said drum, said drum and cover plates having a central opening and a plurality of openings surrounding the central opening and receiving grooved rods, the rods which pass through said plurality of openings terminating in ball bearings, a pair of end plates adjacent said cover plates and having openings which correspond with the openings of the cover plates, said ball bearings being supported in part by the openings in the cover plates and in part by the openings in the end plates and a threaded rod passing through said central opening and adapted to mesh with all of said grooved rods said cover plates being provided with flanged portions which extend into counterbored openings in the end plates whereby the cover plates and the drum are adapted to rotate with respect to the end plates, and means for rotating the drum and cover plates from a position external of the coupling.

10. A coupling for driving and driven members, said coupling comprising a drum, a pair of cover plates secured to the ends of said drum, said drum and cover plates having a central opening and a plurality of openings surrounding the central opening all of which receive grooved rods, the rods contained in said openings terminating in ball bearings, a pair of end plates adjacent said cover plates and having openings which correspond with the openings of the cover plates, said ball bearings being supported in part by the openings in the cover plates and in part by the openings in the end plates, said cover plates being provided with flanged portions which extend into counterbored openings in the end plates whereby the cover plates and the drum are adapted to rotate with respect to the end plates, and means for rotating the drum and cover plates from a position external of the coupling, said means comprising a segmental gear secured to said drum and a pinion meshing with said gear, said pinion being carried on a shaft which is adapted to be rotated by a hand-operated lever, said lever being adapted to be swung to one of two positions to cause the drum and cover plates to move in such a direction that all of the grooved rods are brought either into engagement or out of engagement depending on the direction in which the lever is moved, whereby the coupling is either engaged or disengaged.

11. A coupling for driving and driven members, said coupling comprising a drum, a pair of cover plates fixedly secured to said drum, said drum and cover plates having a central opening and a plurality of openings extending longitudinally of the drum and cover plates and surrounding the central opening, all of said openings being adapted to receive grooved rods, the rods which extend through said surrounding openings terminating in ball bearings, and a pair of end plates adjacent said cover plates and rotatably mounted with respect to said cover plates, said end plates having openings which correspond to the openings in the cover plates, said ball bearings being supported in part by the openings in the cover plates and in part by the openings in the end plates, all of said openings having a configuration and being so positioned such that when the cover plates are moved relative to the end plates the ball bearings are moved as a unit inwardly and outwardly depending on the direction in which the cover plates are moved, whereby the grooves of the rods which surround the central rod are moved selectively into and out of engagement with the threads of the central rod.

12. A motion transmitting device comprising a screw, a plurality of thread-engaging members for said screw disposed in planetary arrangement about said screw, a common mounting means for said members adapted for rotation, and means for simultaneously moving all of said members out of thread-engaging position when said mounting means is rotated.

JOHN C. WILSON.